3,358,026
TRICYCLIC HYDROXYLAMINES
Herbert Schröter, Reinach, Basel-Land, and Daniel A. Prins, Oberwil, Basel-Land, Switzerland, assignors to Geigy Chemical Corporation, Greenburgh, N.Y., a corporation of Delaware
No Drawing. Filed May 3, 1965, Ser. No. 452,872
Claims priority, application Switzerland, May 6, 1964, 5,963/64
5 Claims. (Cl. 260—570.8)

The present invention concerns new therapeutically valuable tricyclic hydroxylamines and a process for the production thereof.

According to a first invention aspect, compounds of the general formula (in which the numbering is in accord with Chemical Abstracts)

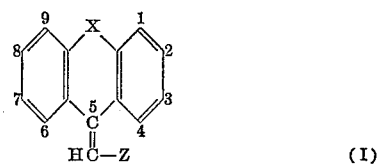

(I)

wherein X represents ethylene (—CH$_2$—CH$_2$—) or vinylene (—CH=CH—),

Z represents the grouping

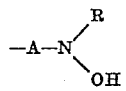

in which

—A— represents straight or branched chain alkylene of from 1 to 4 carbon atoms and
R represents lower alkyl, preferably methyl, or
Z represents the grouping

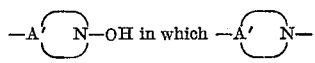

represents C-pyrrolidinyl,
C-pyrrolidinylmethyl,
C-piperidinyl,
C-piperidinylmethyl,
C-hexahydroazepinyl or
C-hexahydroazepinylmethyl, and their pharmaceutically acceptable addition salts with inorganic and organic acids, possess valuable pharmacological properties, especially action in the central nervous system, as shown by antagonism to the action of reserpine and tetrabenazine and potentiation of noradrenalin. The compounds of Formula I also have some calmative action.

New compounds of the general Formula I and their therapeutically acceptable salts can be used, for example, in the treatment of certain forms of mental disease, in particular of depressions. Compositions containing such new compounds may be administered orally or rectally; in solution they may also be administered parenterally.

Illustrative for some of the valuable pharmacological properties possessed by the compounds produced according to the invention are (a) the reduction of spontaneous motility and (b) the activity shown in the "Test de Traction." For 5 - [γ-(N-hydroxy-N-methylamino)-propylidene] - 10,11 - dihydro - 5H - dibenzo[a,d]cycloheptene the effective dose levels, De 50, determined according to W. Theobald et al., Arch. int. Pharmacodyn. 148, 560–596 [1964], were found to be for (a) 6 mg./kg. i.p. in mice, and for (b) 8.6 mg./kg. s.c. in mice.

In the compounds of the general Formula I, A can be, for example, the 1-ethanyl-2-ylidene (=CH—CH$_2$—), the 1-propanyl-3-ylidene (=CH—CH$_2$—CH$_2$—), the 2-methyl - 1 - propanyl - 3 - ylidene or the 1-methyl-1-propanyl-3-ylidene moiety. R, as lower alkyl group, can be, for example, the methyl, ethyl, propyl, isopropyl, n-butyl or the sec. butyl groups; the compounds of Formula II in which R represents a methyl group, are preferred on account of their stronger activity. If =AN(OH)R represents an N-hydroxy - C - pyrrolidinylalkylidene, N-hydroxy-piperidylalkylidene or the N - hydroxy-C-hexahydroazepinylalkylidene radical, then it is, for example, the N - hydroxy - 2 - (2'-pyrrolidinyl) - ethylidene, N-hydroxy - 2 - (2'-piperidyl) - ethylidene, N-hydroxy-2-(2'-hexahydroazepinyl) - ethylidene, N - hydroxy-3-(2'-pyrrolidinyl) - methylidine, N - hydroxy - 3 - (2'-piperidyl) - methylidine or the N-hydroxy - 3 - (2'-hexahydroazepinyl)-methylidine radical.

According to a second aspect of the invention, compounds of the general formula

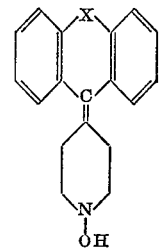

(IA)

wherein X has the same meaning as in Formula I, and their pharmaceutically acceptable salts with acids are distinguished by absence of activity on the central nervous system but possess pronounced peripheral activity; in particular, they show strong serotonin antagonistic activity essentially free from antihistaminic action and tetrabenazine antagonism; they can be used for achieving alleviation in carcinoid syndromes, especially those characterized by over-production of serotonin.

The new compounds of general Formulas I and IA are produced by solvolyzing N-acyloxy compounds of the general formulas

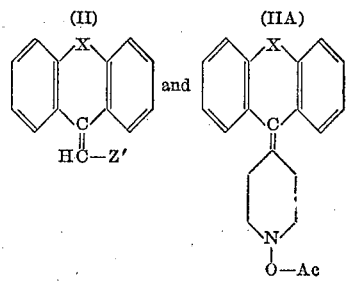

respectively, in which formulas

Z' represents the groupings

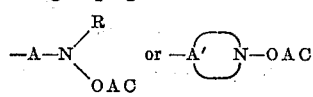

in which —A— and

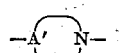

have the above meanings,

Ac represents the acyl radical of an aliphatic or non-condensed aromatic monocarboxylic or o-dicarboxylic acid of maximally 10 carbon atoms, and
X and R have the meanings given in Formula I,
and optionally converting the compounds obtained of general Formula I into a salt with an inorganic or organic acid.

Of particular interest are the compounds falling under Formula II in which Ac represents the acyl radical of an alkanoic acid of from 2 to 5 carbon atoms, benzoic acid, or a methyl-substituted benzoic acid of not more than 10 carbon atoms.

The N-acyloxy compounds of general Formulas II of II-A, respectively, can be solvolyzed, e.g. with an alkali hydroxide, particularly with potassium hydroxide, in an aqueous lower alkanol such as methanol or ethanol. Instead of aqueous-alcoholic alkali hydroxide solution, an alkali alcoholate, such as sodium methylate in a lower alkanol such as methanol, can also be used for the solvolysis.

The compounds of the general Formulas II and II-A are produced by reacting a secondary amine of the general formulas

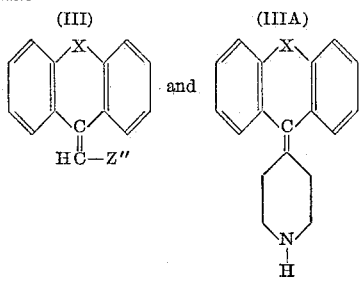

respectively, in which formula Z″ represents the groupings

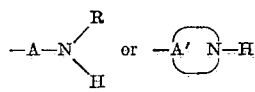

in which —A— and

have the above meanings, and X and R have the meanings given in Formula I, with an acyl peroxide to form an N-acyloxy compound of the general Formulas II and II-A the reaction being performed in an inert solvent, or by acylating a compound of the general Formula I or IA, respectively, with an acid anhydride or an acyl chloride by a conventional method.

The amines of the general Formulas III and III-A are converted into compounds of general Formulas II and II-A, respectively by adding a solution of an acyl peroxide, particularly peroxides of monocarboxylic acids such as acetyl peroxide, benzoyl peroxide, acetyl-benzoyl peroxide, or of dicarboxylic acids such as phthaloyl peroxide, to a solution of an amine of the general Formula III or III-A—or, in reverse, preparing the solution of an acyl peroxide and adding that of an amine thereto—and maintaining a reaction temperature of about —50 to +80°, preferably one of 0 to 20°. Suitable solvents for the amines and acyl peroxides are chlorinated hydrocarbons such as chloroform or carbon tetrachloride, ethers such as diethyl ether or tertahydrofuran, hydrocarbons such as benzene or toluene and also dimethyl formamide or mixtures thereof.

Most compounds of general Formulas III and III-A are known and others can be produced analogously; the 5-(2′-methylaminoethylidene), 5-(2′-methylamino-propylidene), 5-(3′-methylamino - propylidene), 5 - (3′-methyl-amino-2′-methylpropylidene), 5-[2′ - (2″ - pyrrolidinyl)-ethylidene], 5-[2′-(2″-piperidyl)-ethylidene] and 5-[2′-(2″-hexahydroazepinyl)-ethylidene] derivatives of 5H-dibenzo[a,d]cycloheptene and 10,11-dihydro-5H-dibenzo[a,d]cycloheptene as well as the ethylamino, isopropylamino and sec. butylamino compounds corresponding to the methylamino compounds mentioned, can be enumerated.

The compounds of general Formulas II and II-A in which Ac represents an acyl radical such as the acetyl, propionyl, n-butyryl, isobutryryl, valeryl, isovaleryl, 2-methylbutyryl, pivalyl, 3-carboxy-propionyl radical or the benzoyl radical, a mono-, di-, tri-methyl-benzoyl radical, particularly the 2,6-dimethyl- and 2,4,6-trimethyl-benzoyl radical or an o-carboxy-benzoyl radical, are new.

The following compounds can be given as examples: N-[3-(5′H-dibenzo[a,d]cyclohepten-5′- ylidene)propyl]-N-methyl-O-benzoyl hydroxylamine, N-[3-(10′,11′-dihydro-5′H-dibenzo[a,d]cyclohepten-5′-ylidene)-2 - methylpropyl]-N-methyl-O-benzoyl hydroxylamine and 1-benzoyloxy-3-(10′,11′-dihydro - 5′H - dibenzo[a,d]cyclohepten-5′-ylidenemethyl)-pyrrolidine.

As mentioned above, the new active substances of general Formula I are administered perorally and parenterally. The daily dosages of the free bases or of non-toxic salts thereof vary between 10 and 300 mg. for adult patients. Suitable dosage units such as dragées (sugar coated tablets), tablets, suppositories or ampoules preferably contain 5 to 50 mg. of an active substance according to the invention or of a non-toxic salt thereof.

By non-toxic salts of the bases usable according to the invention are meant salts with those acids the anions of which are pharmacologically acceptable in the usual dosages, i.e. those which have no toxic effects. It is also of advantage if the salts to be used crystallize well and are not or are only slightly hygroscopic. Examples of non-toxic salts of the active substances are those with hydrochloric acid, hydrobromic acid, sulphuric acid, phosphoric acid, methane sulphonic acid, ethane disulphonic acid and β-hydroxyethane sulphonic acid.

Dosage units for the peroral application preferably contain as active substance between 1 and 90% of a compound of the general Formulas I and I-A or of a non-toxic salt thereto. They are produced by combining the active substance, for example, with solid, pulverulent carriers such as lactose, saccharose, sorbitol, mannitol; starches such as potato starch, corn starch or amylopectin, also laminaria powder or citrus pulp power; cellulose derivatives of gelatines, optionally with the addition of lubricants such as magnesium or calcium stearate or polyethylene glycols (carbowaxes) of suitable molecular weights, to form tablets or dragée cores. The latter are coated, for example with concentrated sugar solutions which can also contain, e.g. gum arabic, talcum and/or titanium dioxide, or with a lacquer dissolved in easily volatile organic solvents or in mixtures of solvents. Dyestuffs can be added to these coatings, for example, to distinguish between different dosages of active substance.

Dosage units for the rectal application are, e.g. suppositories which consist of a combination of an active substance or of a suitable salt thereof with a neutral fatty foundation, or also gelatine rectal capsules which contain a combination of the active substance or a suitable salt thereof with polyethylene glycols (carbowaxes) of suitable molecular weight.

Ampoules for parenteral, particularly intramuscular, administration preferably contain a water soluble salt of an active substance in a concentration of preferably 0.5–5%, in aqueous solution, optionally together with suitable stabilizing agents and buffer substances.

The following instructions further illustrate the production of tablets and dragées:

(a) 250 g. of N-[3-(10′,11′-dihydro-5′H-dibenzo[a,d]cyclohepten - 5′ - ylidene)-propyl]-N-methyl-hydroxylamine hydrochloride are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 250 g. of magnesium stearate and 32 g. of colloidal silicon dioxide are mixed in and the mixture is pressed into 10,000 tablets each weighing 100 mg. and containing 25 mg. of active substance (hydrochloride). If desired, the tablets can be grooved to attain better adaptation of the dosage.

(b) A granulate is produced from 250 g. of N-[3-(10′, 11′ - dihydro-5′H-dibenzo[a,d]cycloheptene-5′-ylidene)-propyl]-N-methyl-hydroxylamine hydrochloride, 175.90 g. of lactose and the alcoholic solution of 10 g. of stearic acid. After drying, 56.60 g. of colloidal silicon dioxide, 165 g. of talcum, 20 g. of potato starch and 2.50 g. of magnesium stearate are mixed in and the mixture is pressed into 10,000 dragée cores. These are then coated with a concentrated syrup made of 502.28 g. of crystallized saccharose, 6 g. of shellac, 10 g. of gum arabic, 0.22 g. of dyestuff and 1.5 g. of titanium dioxide and dried. The dragées obtained each weight 120 mg. and contain 25 mg. of active substance.

The following examples further illustrate the production of the new compounds of general Formulas I and IA and of previously undescribed intermediate products, but are by no means the only methods of producing same. The temperatures are given in degrees centigrade.

*Example 1*

(a) 13.2 g. of 5-(3'-methylamino-propylidene)-10,11-dihydro-5H-dibenzo[a,d]cycloheptene are dissolved in 300 ml. of dry diethyl ether and the solution is cooled to 5°. A solution of 6.65 g. of 97% benzoyl peroxide in 30 ml. of chloroform and 90 ml. of dry diethyl ether is added to this solution dropwise within 45 minutes while stirring and the whole is then stirred for another 3 hours at 0-5°. The precipitate formed, the benzoic acid salt of 5-(3'-methylamino-propylidene)-10,11-dihydro-5H-dibenzo[a,d]cycloheptene, is filtered off under suction and washed with diethyl ether. The clear filtrate is washed with 2 N sodium carbonate solution, 2 N hydrochloric acid and water, dried over sodium sulfate and concentrated in vacuo. 8.4 g. of N-[3-(10',11'-dihydro-5'H-dibenzo[a,d]cyclohepten - 5'-ylidene)-propyl]-N-methyl-O-benzoyl-hydroxylamine are obtained; it crystallizes from methanol, M.P. 90–100°, and after recrystallization from diethyl ether/pentane it melts at 108–110°.

(b) 6.3 g. of the hydroxylamine produced according to (a) are dissolved in 150 ml. of boiling ethanol and then 10 ml. of water and 10 ml. of 2 N potassium hydroxide solution are added quickly one after the other. The solution is then cooled to 20°, left to stand for 15 minutes at 20° and the ethanol is evaporated off in vacuo. The residue is diluted with 20 ml. of water and exhaustively extracted with diethyl ether. The ethereal extract is dried over sodium sulfate and concentrated in vacuo. The residue crystallizes from diethyl ether/pentane. 4.0 g. of N-[3-(10',11'-dihydro-5'H-dibenzo[a,d]cyclohepten - 5' - ylidene)-propyl]-N-methyl hydroxylamine are obtained, M.P. 93–94°. The hydrochloride is prepared from the chloroform solution of the free base with ethereal hydrochloric acid, M.P. 142–143°.

*Example 2*

(a) The following compounds are obtained in accordance with Example 1 step (a) with benzoyl peroxide:

(i) from 5 - (3'-methylamino-2'-methyl-propylidene)-10,11 - dihydro-5H-dibenzo[a,d]cycloheptene there is obtained N - [3-(10',11'-dihydro-5'H-dibenzo[a,d]cyclohepten - 5' - ylidene)-2-methylpropyl]-N-methyl-O-benzoyl hydroxylamine, M.P. 78–80°;

(ii) from 3 - (10',11'-dihydro-5'H-dibenzo[a,d]cyclohepten-5'-ylidenemethyl)-pyrrolidine there is obtained the non-crystallized 1-benzoyloxy-3-(10',11'-dihydro-5'H-dibenzo[a,d]cyclohepten - 5' - ylidenemethyl)-pyrrolidine; $R_f$=0.85 [determined in thin-layer chromatogram on kieselguhr (neutral), eluant: benzene:methanol (3:1)];

(iii) from 2 - [2'-(10",11"-dihydro-5"H-dibenzo[a,d]cyclohepten - 5" - ylidene)-ethyl]-piperidine there is obtained the non-crystallized 1-benzoyloxy-2-[2'-(10",11"'-dihydro - 5"H-dibenzo[a,d]cyclohepten-5"-ylidene)-ethyl]-piperidine; $R_f$=0.88 [determined in thin-layer chromatogram on kieselguhr (neutral), eluant: benzene:methanol (3:1)];

(iv) from 5 - (3'-methylamino-propylidene)-5H-dibenzo[a,d]cycloheptene there is obtained N-[3-(5'H-dibenzo[a,d]cyclohepten - 5' - ylidene)-propyl]-N-methyl-O-benzoyl-hydroxylamine, M.P. 137–138°;

(v) from 3-(10',11"-dihydro-5'H-dibenzo[a,d]cyclohepten-5'-ylidenemethyl) - pyrrolidine: 1 - benzoyloxy-3-(10',11' - dihydro - 5'H - dibenzo[a,d]cyclohepten - 5'-ylidenemethyl)-pyrrolidine, $R_f$ 0.85, determined as under (ii), supra.

(vi) from 2-[2'-(10",11"-dihydro-5"H-dibenzo[a,d]cyclohepten-5"-ylidene)-ethyl]-hexahydroazepine there is obtained 1 - benzoyloxy-2-[2'-(10",11"-dihydro-5"H-dibenzo[a,d]cyclohepten - 5" - ylidene)-ethyl]-hexahydroazepine.

(vii) from 3-(10',11'-dihydro-5'H-dibenzo[a,d]cyclohepten-5'-ylidenethyl)-pyrrolidine there is obtained the non-crystallized 1-benzoyloxy - 3 - (10',11'-dihydro-5'H-dibenzo[a,d]cyclohepten-5'-ylidenethyl)-pyrrolidine.

(viii) from 2-[2'-(10",11"-dihydro-5"H-dibenzo[a,d]cyclohepten-5"-ylidene)-methyl]-piperidine there is obtained the non-crystallized 1-benzoyloxy-2-[2'-(10",11"'-dihydro - 5"H - dibenzo[a,d]cyclohepten - 5" - ylidene) methyl]-piperidine.

(ix) from 3-(10',11'-dihydro-5'H-dibenzo[a,d]cyclohepten-5'-ylidenemethyl)-hexahydroazepine there is obtained the non-crystallized 1-benzoyloxy-3-(10',11'-dihydro-5'H-dibenzo[a,d]cyclohepten - 5' - ylidenemethyl) hexahydroazepine.

(x) from 3-(5'H-dibenzo[a,d]cyclohepten-5'-ylidenemethyl)-pyrrolidine there is obtained the non-crystallized 1 - benzoyloxy - 3 - (5'H - dibenzo[a,d]cyclohepten - 5'-ylidenemethyl)-pyrrolidine.

Correspondingly acylated compounds are obtained by using in this example in lieu of benzoyl peroxide an equivalent amount of the following peroxides: acetyl peroxide, succinyl peroxide or phthaloyl peroxide.

(b) The following compounds are obtained analogously to step (b) of Example 1 with potassium hydroxide solution:

(i) from N-[3-(10',11'-dihydro-5'H-dibenzo[a,d]cyclohepten-5'-ylidene) - 2 - methyl - propyl] - N - methyl-O-benzoyl-hydroxylamine there is obtained N-[3-(10',11'-dihydro-5'H-dibenzo[a,d]cyclohepten - 5' - ylidene) - 2-methyl-propyl]-N-methyl - hydroxylamine, the hydrobromide melts at 178–185°;

(ii) from 1-benzoyloxy-3-(10',11'-dihydro-5'H-dibenzo[a,d]cyclohepten-5'-ylidenemethyl) - pyrrolidine is obtained the non-crystallized 3-(10',11'-dihydro-5'H-dibenzo[a,d]cyclohepten - 5' - ylidenemethyl) - 1 - hydroxypyrrolidine, $R_f$=0.72 [Thin layer chromatogram on kieselgur (neutral), eluant: benzene: methanol (3:1)];

(iii) from 1-benzoyloxy-2-[2'-(10",11"-dihydro-5"H-dibenzo[a,d]cyclohepten-5"-ylidene) - ethyl] - piperidine there is obtained 2-[2'-(10",11"-dihydro-5"H-dibenzo[a,d]cyclohepten-5"-ylidene)-ethyl] - 1 - hydroxy - piperidine, M.P. 144–145°;

(iv) from N - [3 - (5'H-dibenzo[a,d]cyclohepten-5'-ylidene)-propyl]-N-methyl - O - benzoyl - hydroxylamine there is obtained N-[3-(5'H-dibenzo[a,d]cyclohepten-5'-ylidene)-propyl]-N-methyl-hydroxylamine, M.P. 99–100°;

(v) from 1-benzoyloxy-3-(10',11'-dihydro-5'H-dibenzo[a,d]cyclohepten-5' - ylidenemethyl) - pyrrolidine there is obtained 3-(10',11'-dihydro-5'H-dibenzo[a,d]cyclohepten-5'-ylidenemethyl)-1-hydroxy-pyrrolidine, $R_f$ 0.72, determined as under (ii), supra.

(vi) from 1-benzoyloxy-2-[2'-(10",11"-dihydro-5"H-dibenzo[a,d]cyclohepten-5"-ylidene)-ethyl] - hexahydroazepine there is obtained 2-[2'-(10",11"-dihydro-5"H-dibenzo[a,d]cyclohepten - 5" - ylidene)-ethyl]-1-hydroxyhexahydroazepine.

(vii) from 1-benzoyloxy-3-(10',11'-dihydro-5'H-dibenzo[a,d]cyclohepten-5'-ylidenethyl)-pyrrolidine is obtained the non-crystallized 3-(10',11'-dihydro-5'H-dibenzo[a,d]cyclohepten - 5' - ylidenethyl) - 1 - hydroxypyrrolidine.

(viii) from 1-benzoyloxy-2-[2'-(10",11"-dihydro-5"H-dibenzo[a,d]cyclohepten-5"-ylidene)-methyl] - piperidine there is obtained 2-[2'-(10",11"-dihydro-5"H-dibenzo

[a,d]cyclohepten - 5″ - ylidene) - methyl] - 1 - hydroxy-piperidine.

(ix) from 1-benzoyloxy-3-(10′,11′-dihydro-5′H-dibenzo[a,d]cyclohepten - 5′ - ylidenemethyl)-hexahydroazepine is obtained the non-crystallized 3-(10′,11′-dihydro-5′H-di-benzo[a,d]cyclohepten - 5′ - ylidenemethyl) 1-hydroxy-hexahydroazepine.

(x) from 1-benzoyloxy-3-(5′H-dibenzo[a,d]cyclohepten-5′-ylidenemethyl)-pyrrolidine is obtained the non-crystallized 3 - (5′H-dibenzo[a,d]cyclohepten-5′-ylidene-methyl)-1-hydroxy-pyrrolidine.

Example 3

3.7 g. of N-[3-(10′,11′-dihydro-5′H-dibenzo[a,d]cyclohepten - 5′ - ylidene) - propyl]-N-methyl-O-benzoyl-hydroxylamine are suspended in 20 ml. of anhydrous methanol, 0.1 g. of sodium methylate is added and dissolved by gently heating. The reaction mixture is heated for 2 hours at 20°, then refluxed for 5 minutes after which it is evaporated in vacuo. The residue is distributed between diethyl ether and water. The ethereal phase is washed with water and then exhaustively extracted with 2 N hydrochloric acid. The combined hydrochloric acid extracts are made alkaline with concentrated sodium hydroxide solution and then extracted with diethyl ether. The ethereal extracts are washed with water, dried over sodium sulfate and evaporated in vacuo. The residue crystallizes from diethyl ether/pentane. 2.1 g. of N-[3-(10′,11′-dihydro-5′H - dibenzo[a,d]cyclohepten - 5′ - ylidene) - propyl] - N-methyl hydroxylamine are obtained; M.P. 93–94°.

Example 4

(i) 27 g. of 4-(5′H-dibenzo[a,d]cyclohepten-5′-ylidene)-piperidine are dissolved in 175 ml. of dimethyl formamide and cooled to 0°.

14.5 g. of benzoyl peroxide in 100 ml. dimethyl formamide are added to this solution within 20 minutes at 0–5°, and then the temperature is allowed to rise to 20°. The reaction mixture is diluted with 1 liter of water and exhaustively extracted with diethyl ether. The combined ether extracts are washed successively with water, 2 N hydrochloric acid, 2 N sodium hydroxide solution and water, dried over sodium sulfate and evaporated in vacuo, whereby 1-benzoyloxy-4-(5′H-dibenzo[a,d]cyclohepten-5′-ylidene)-piperidine is obtained, M.P. 155° (from methanol).

17 g. of the starting base can be recovered from the hydrochloric acid extract.

(ii) Working in accordance with the above procedure, but starting from 4-(10′,11′-dihydro-5′H-dibenzo[a,d]cyclohepten-5′-ylidene)-piperidine, there is obtained 1-benzoyloxy - 4 - (10′,11′ - dihydro-5′H - dibenzo[a,d]cyclohepten-5′-ylidene)-piperidine.

Example 5

(i) 19.6 g. of 1-benzoyloxy-4-(5′H-dibenzo[a,d]cyclohepten-5′-ylidene)-piperidine are dissolved hot in 500 ml. of ethanol and at 75° there are successively added 80 ml. of water and 50 ml. of 2 N potassium hydroxide solution. The reaction mixture is allowed to cool for 30 minutes, whereupon the alcohol is distilled off in vacuo. The residue is taken up with water and diethyl ether. The ethereal phase is separated, washed neutral with water, dried over sodium sulfate and evaporated in vacuo, whereby 14.5 g. of 4 - (5′H - dibenzo[a,d]cyclohepten-5′-ylidene)-1-hydroxy-piperidine are obtained, M.P. 199–201° (from acetone).

(ii) Working in accordance with the above procedure, but starting from 1-benzoyloxy-4-(10′,11′-dihydro-5′H-dibenzo[a,d]cyclohepten-5′-ylidene)-piperidine, there is obtained 4 - (10′,11′ - dihydro - 5′H - dibenzo[a,d]cyclohepten-5′-ylidene)-1-hydroxy-piperidine.

Example 6

2.0 g. of acetic anhydride are added slowly at 0° to a solution of 5.6 g. of N-[3-(10′,11′-dihydro-5′H-dibenzo[a,d]cyclohepten-5′-ylidene)-propyl]-N-methyl hydroxylamine in 30 ml. anhydrous pyridine. The reaction mixture is kept for 15 hours at 25°. The pyridine is removed under reduced pressure and the residue is dissolved in ether. The ethereal solution is washed at 0° consecutively with water, 2-N-hydrochloric acid and water, dried over sodium sulfate and evaporated in vacuo, whereby N-[3-(10′,11′-dihydro - 5′H - dibenzo[a,d]cyclohepten - 5′ - ylidene)-propyl]-N-methyl-O-acetyl hydroxylamine is obtained.

The following compounds are obtained in accordance with Example 6, starting with N-[3-(10′,11′-dihydro-5′H - dibenzo[a,d]cyclohepten - 5′ - ylidene) - propyl] - N-methyl hydroxylamine:

(I) with pivalyl chloride instead of acetic anhydride, N-[3 - (10′,11′ - dihydro - 5′H - dibenzo[a,d]cyclohepten-5′-ylidene)-propyl]-N-methyl-O-pivalyl hydroxylamine;

(II) with 2,4,6-trimethylbenzoyl chloride instead of acetic anhydride, N-[3-(10′,11′-dihydro-5′H-dibenzo[a,d]cyclohepten-5′-ylidene)-propyl]-N-methyl-O-(2,4,6 - trimethyl-benzoyl) hydroxylamine.

We claim:

1. A compound of the formula

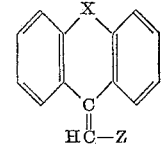

wherein X represents a member selected from the group consisting of —CH₂—CH₂— and —CH=CH—, Z represents a member selected from the group consisting of the grouping

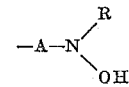

and the grouping

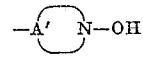

in which groupings —A— represents alkylene of from 1 to 4 carbon atoms, and

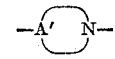

represents a member selected from the group consisting of C-pyrrolidinyl, C-pyrrolidinyl-methyl, C-piperidinyl, C-piperidinyl-methyl, C-hexahydroazepinyl and C-hexahydroazepinyl-methyl, and R represents alkyl of from 1 to 4 carbon atoms.

2. N - [3 - (10′,11′ - dihydro - 5′H - dibenzo[a,d]cyclohepten-5′-ylidene)-propyl]-N-methyl hydroxylamine.

3. N - [3 - (10′,11′ - dihydro - 5′H - dibenzo[a,d]cyclohepten-5′-ylidene)-2-methyl-propyl]-N-methyl - hydroxylamine.

4. N - [3 - (5′H - dibenzo[a,d]cyclohepten - 5′ - ylidene)-propyl]-N-methyl-hydroxylamine.

5. N - [3 - (5′H - dibenzo[a,d]cyclohepten - 5′ - ylidene)-2-methyl-propyl]-N-methyl-hydroxylamine.

References Cited

UNITED STATES PATENTS

| | | | |
|---|---|---|---|
| 3,051,625 | 8/1962 | Rao | 167—78 |
| 3,072,530 | 1/1963 | Hoffman | 167—65 |
| 3,098,010 | 7/1963 | Everett | 167—65 |
| 3,190,893 | 6/1965 | Holm | 260—240 |
| 3,196,150 | 7/1965 | Grisar | 260—240 |
| 3,224,943 | 12/1965 | Espy | 167—78 |

WALTER A. MODANCE, *Primary Examiner.*

JULIAN S. LEVITT, *Examiner.*

S. J. FRIEDMAN, A. D. SPEVACK, *Assistant Examiners.*